(12) United States Patent
Anderson et al.

(10) Patent No.: US 6,893,203 B2
(45) Date of Patent: May 17, 2005

(54) COMBINATION PICKUP TRUCK LIFTGATE/ TAILGATE

(75) Inventors: Jeffrey A. Anderson, Belleville, MI (US); Jon F. Baker, Bloomfield Hills, MI (US); Michael E. Kennedy, Fowlerville, MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 76 days.

(21) Appl. No.: 10/175,635

(22) Filed: Jun. 20, 2002

(65) Prior Publication Data

US 2002/0197142 A1 Dec. 26, 2002

Related U.S. Application Data

(60) Provisional application No. 60/299,661, filed on Jun. 20, 2001.

(51) Int. Cl.[7] .................................................. B60P 1/00
(52) U.S. Cl. ........................ 414/557; 414/545; 414/467
(58) Field of Search ................................ 414/557, 556, 414/545, 546, 539, 467; 280/400, 401

(56) References Cited

U.S. PATENT DOCUMENTS

| | | | | |
|---|---|---|---|---|
| 3,077,275 A | * | 2/1963 | Wise ........................... | 414/557 |
| 3,305,112 A | * | 2/1967 | Brown ......................... | 414/557 |
| 3,467,266 A | | 9/1969 | Vanderjagt | |
| 3,637,097 A | * | 1/1972 | Horowitz ..................... | 414/557 |
| 3,688,649 A | | 9/1972 | Hostetler | |
| 3,700,123 A | | 10/1972 | Corley, Jr. | |
| 3,889,827 A | * | 6/1975 | Fine ........................... | 414/557 |
| 4,007,844 A | * | 2/1977 | Perkins ....................... | 414/471 |
| 4,787,809 A | | 11/1988 | Zrostlik | |
| 4,813,842 A | | 3/1989 | Morton | |
| 4,991,890 A | | 2/1991 | Paulson | |
| 5,470,188 A | * | 11/1995 | Ebato ......................... | 414/545 |
| 5,513,943 A | * | 5/1996 | Lugash et al. .............. | 414/545 |
| 5,641,262 A | * | 6/1997 | Dunlop et al. .............. | 414/557 |
| 5,941,677 A | * | 8/1999 | De Boer ..................... | 414/557 |
| 6,102,646 A | * | 8/2000 | Bass et al. .................. | 414/537 |

FOREIGN PATENT DOCUMENTS

GB  2 276 592 A  10/1994

* cited by examiner

Primary Examiner—Eileen D. Lillis
Assistant Examiner—Michael Lowe
(74) Attorney, Agent, or Firm—McDonnell Boehnen Hulbert & Berghoff LLP

(57) ABSTRACT

A liftgate/tailgate assembly for a vehicle having a chassis and a cargo area, such cargo area comprising a bed and one or more vertical sidewalls mounted to the vehicle chassis, such liftgate/tailgate assembly comprising a tailgate which, when rotated into an open tailgate position, forms a liftgate/tailgate platform to support a load to be lifted, and one or more linkage assemblies pivotably mounted to the tailgate which permit the liftgate/tailgate platform to be translated both vertically and horizontally relative to the cargo area of the vehicle, while permitting rear impact protection to be mounted on the vehicle and method for lifting a load into a vehicle cargo area.

4 Claims, 15 Drawing Sheets

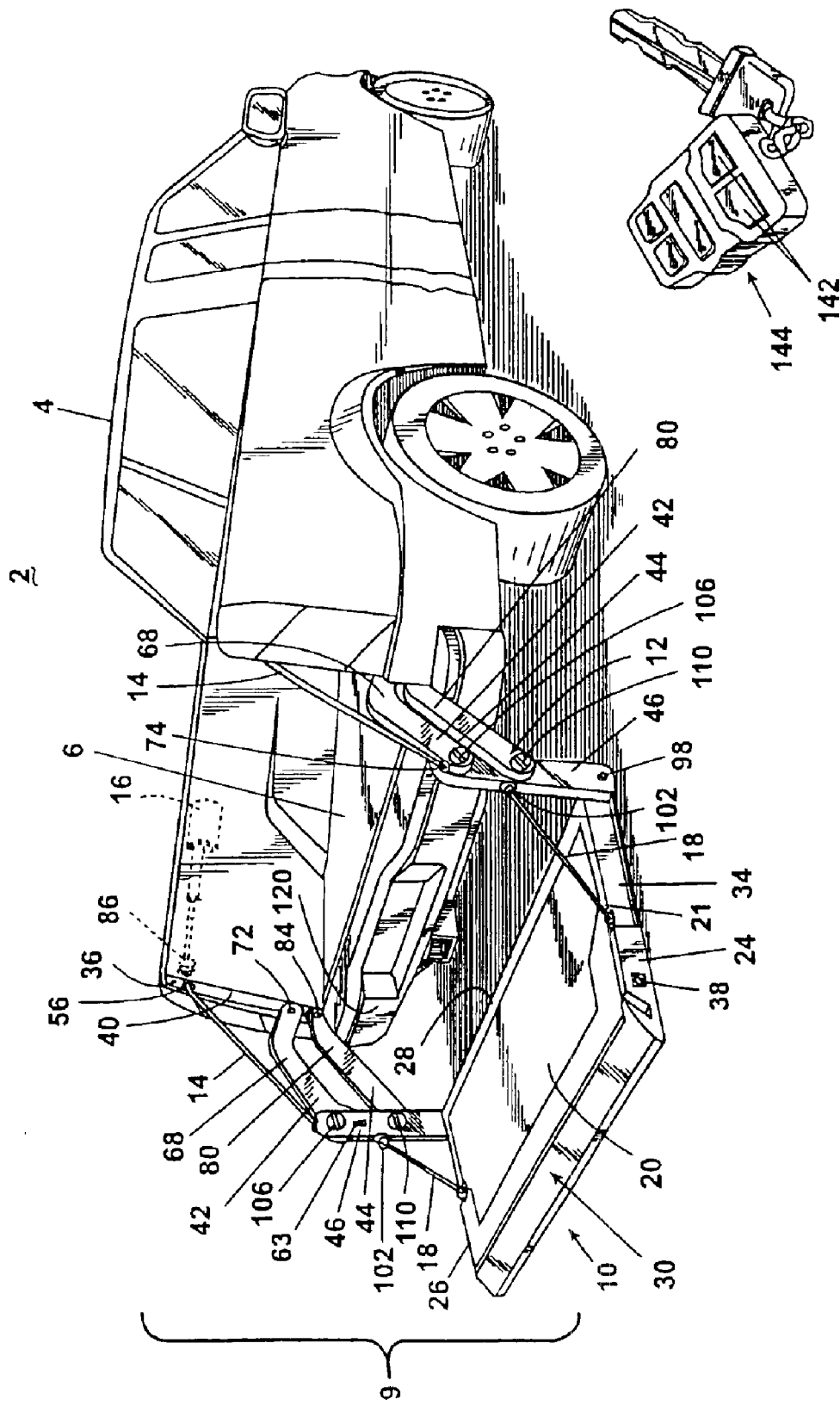

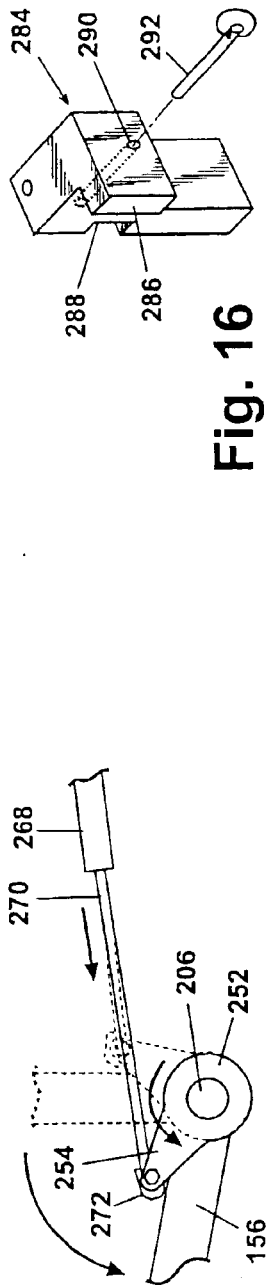
Fig. 16
Fig. 14
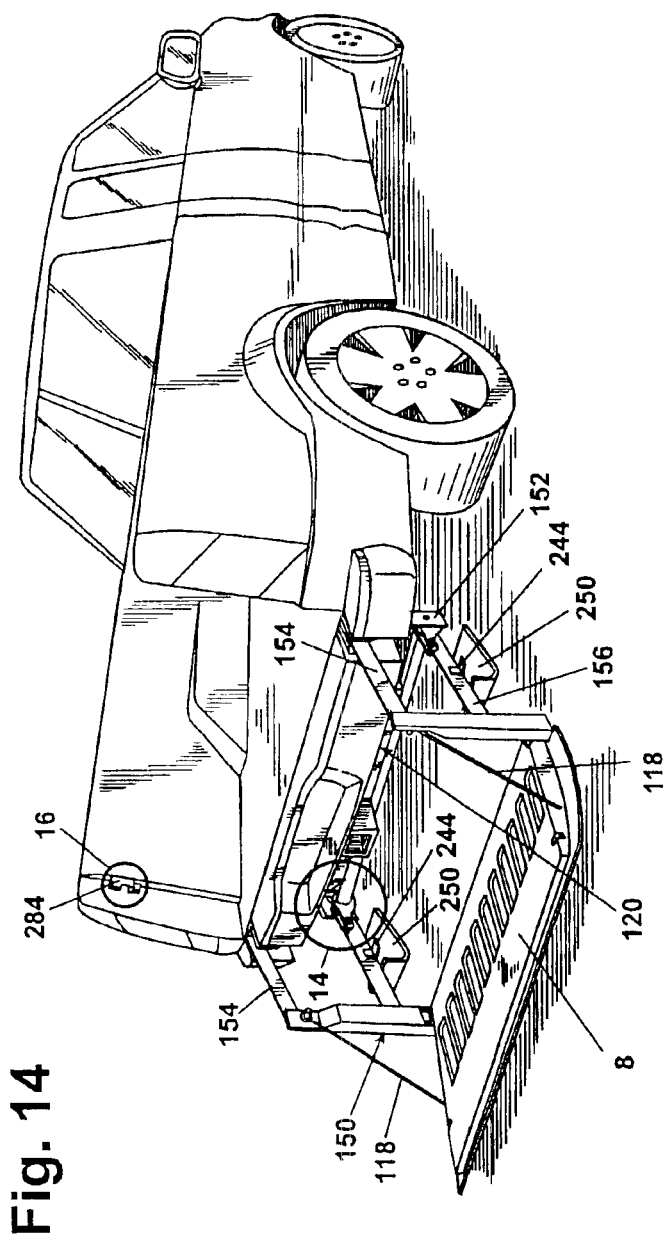
Fig. 13

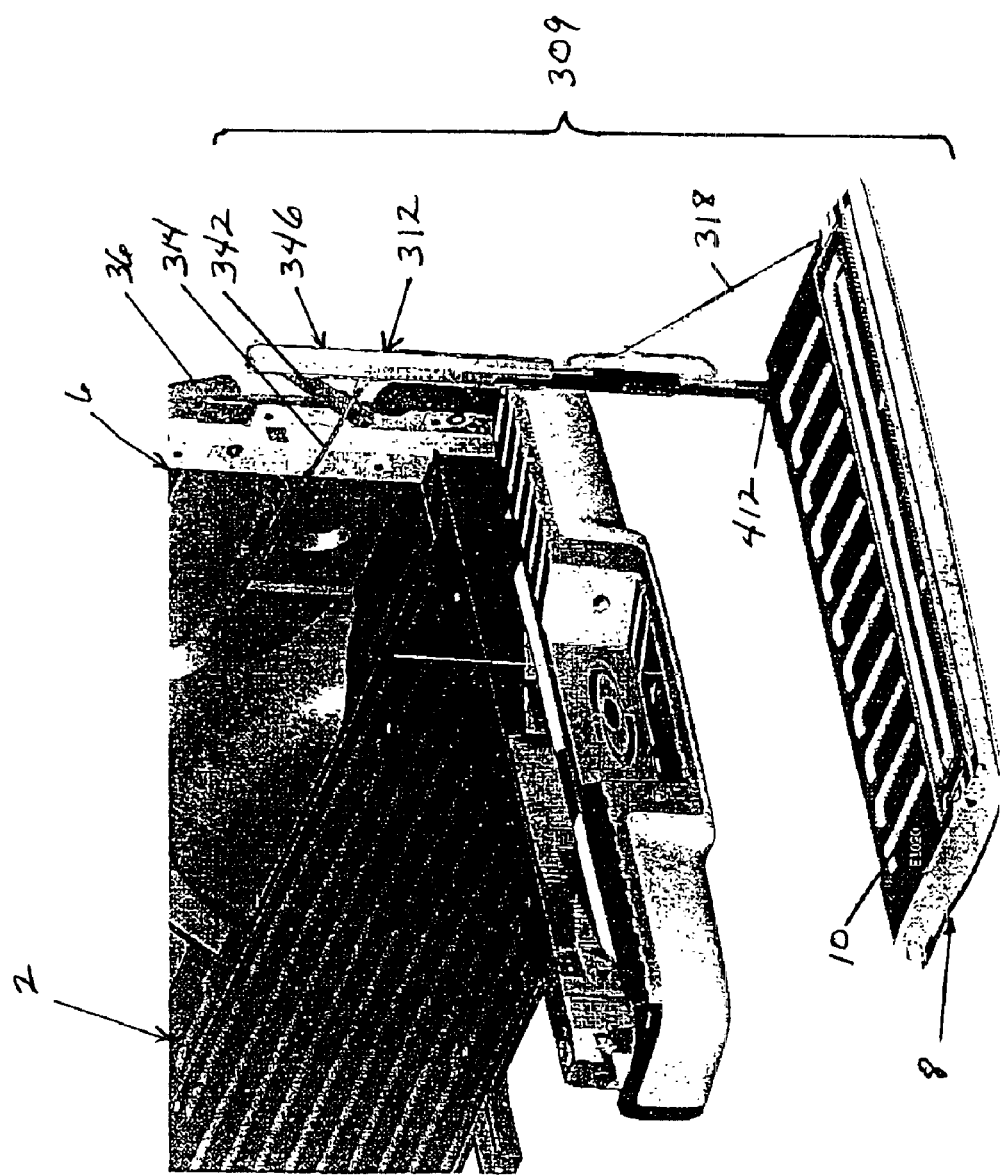

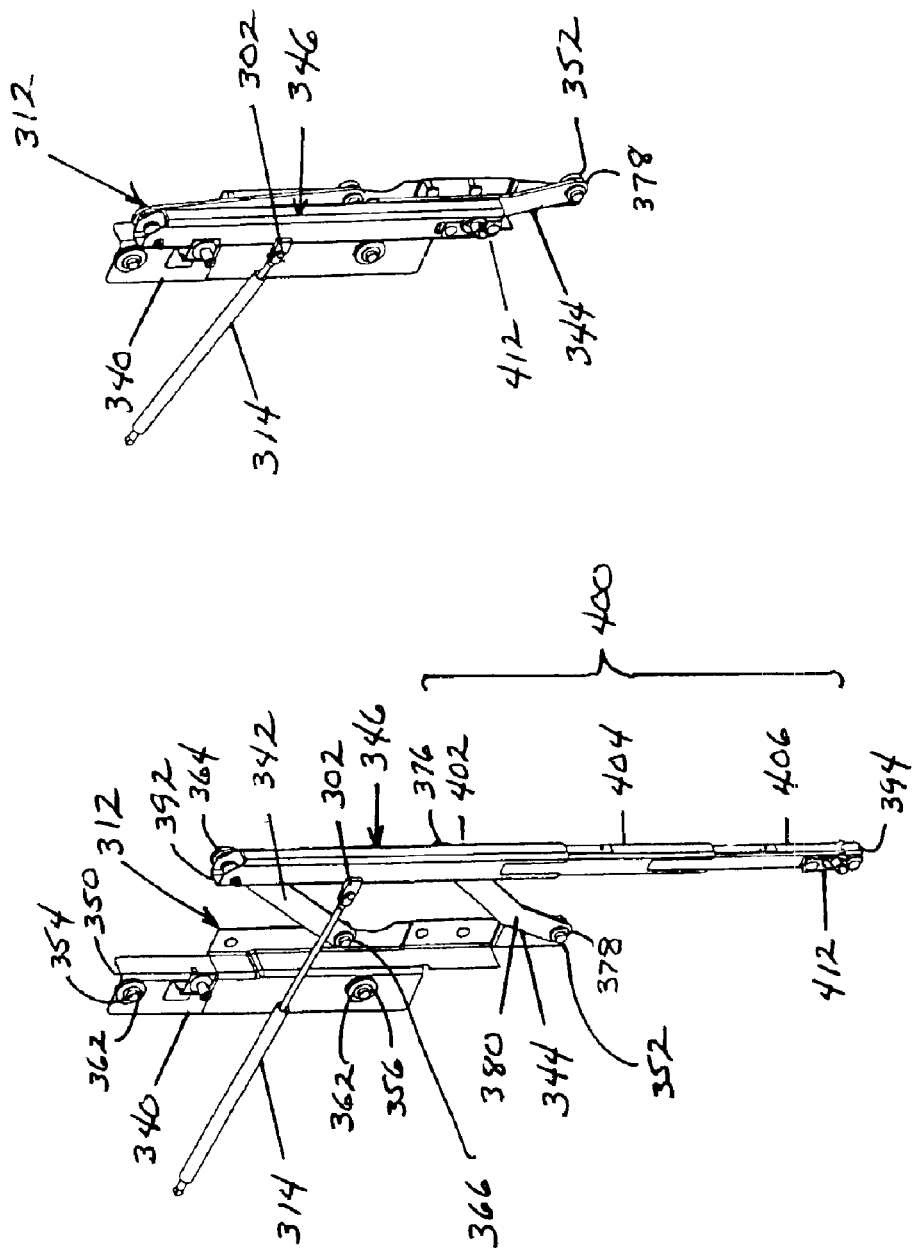

COMBINATION PICKUP TRUCK LIFTGATE/TAILGATE

This application claims priority of U.S. patent application Ser. No. 60/299,661.

BACKGROUND OF THE INVENTION

1. Field of the Invention

The invention relates to tailgates and liftgates for motor vehicles. Specifically, the invention relates to a combination liftgate/tailgate for a pickup truck that matches the styling of the vehicle, maximizes the useable cargo space and operates as a standard tailgate when the liftgate is not in use.

2. Description of the Related Art

Lift assemblies are used in a variety of vehicles, such as large trucks, mini vans, and pickup trucks for elevating heavy objects between ground level and bed level of a vehicle. They are typically mounted on the rear or the vehicle, and comprise a lifting platform, an electric or hydraulic mechanism that operates the lifting platform, and controls. When the lift is not in use, the platform can be folded up to serve as a gate.

Such liftgates are typically installed on the vehicle as a retrofit assembly often in place of an existing tailgate. Consequently, their styling generally does not match that of the vehicle to which they are installed, particularly in the case of pickup trucks because the tailgate is removed. Furthermore, the typical retrofit liftgate assembly occupies a portion of the bed of the vehicle, thereby reducing the vehicle's cargo carrying capacity. As well, such liftgates do not operate in the typical manner as tailgates when the lift is not in use because they require the attachment of substantial additional hardware to the vehicle bed to retain the liftgate in an upright, non-use position.

SUMMARY OF THE INVENTION

The invention comprises a combination liftgate/tailgate for a pickup truck that matches the styling of the vehicle, maximizes the useable cargo carrying capacity, and operates as a tailgate in the normal manner when the lift is not in use. The lift mechanism is concealed when the lift is not in use, and the controls for the lift mechanism can be incorporated into a key fob.

BRIEF DESCRIPTION OF THE DRAWINGS

In the drawings:

FIG. 3 is a perspective view of the combination liftgate/tailgate assembly of FIG. 1 showing its use as a liftgate in the fully lowered position;

FIG. 4 is a close-up view of a key fob incorporating the liftgate control buttons for the combination liftgate/tailgate assembly of FIG. 1 with substantially all of the vehicle removed for clarity;

FIG. 13 is a perspective view of the combination liftgate/tailgate assembly of FIG. 7 showing its use as a liftgate in the fully lowered position;

FIG. 14 is a detailed view of the liftgate operating mechanism of the alternative embodiment of FIG. 7 showing the pivoting of the lower link by extension of the piston rod;

FIG. 15 is a close-up view of a key fob incorporating liftgate control buttons for controlling the operation of the combination liftgate/tailgate assembly of FIG. 7; and FIG. 16 is a detailed view of a tailgate retainer block for the alternative embodiment of FIG. 7.

FIG. 17 is a perspective view of an alternative combination liftgate/tailgate assembly.

FIG. 18 is a detailed view of the liftgate operating mechanism of the alternative embodiment of FIG. 17 showing the various links in the liftgate lowered position.

FIG. 19 is a detailed view of the liftgate operating mechanism of the alternative embodiment of FIG. 17 showing the various links in the liftgate raised position.

DESCRIPTION OF THE PREFERRED EMBODIMENT

Figure 1:
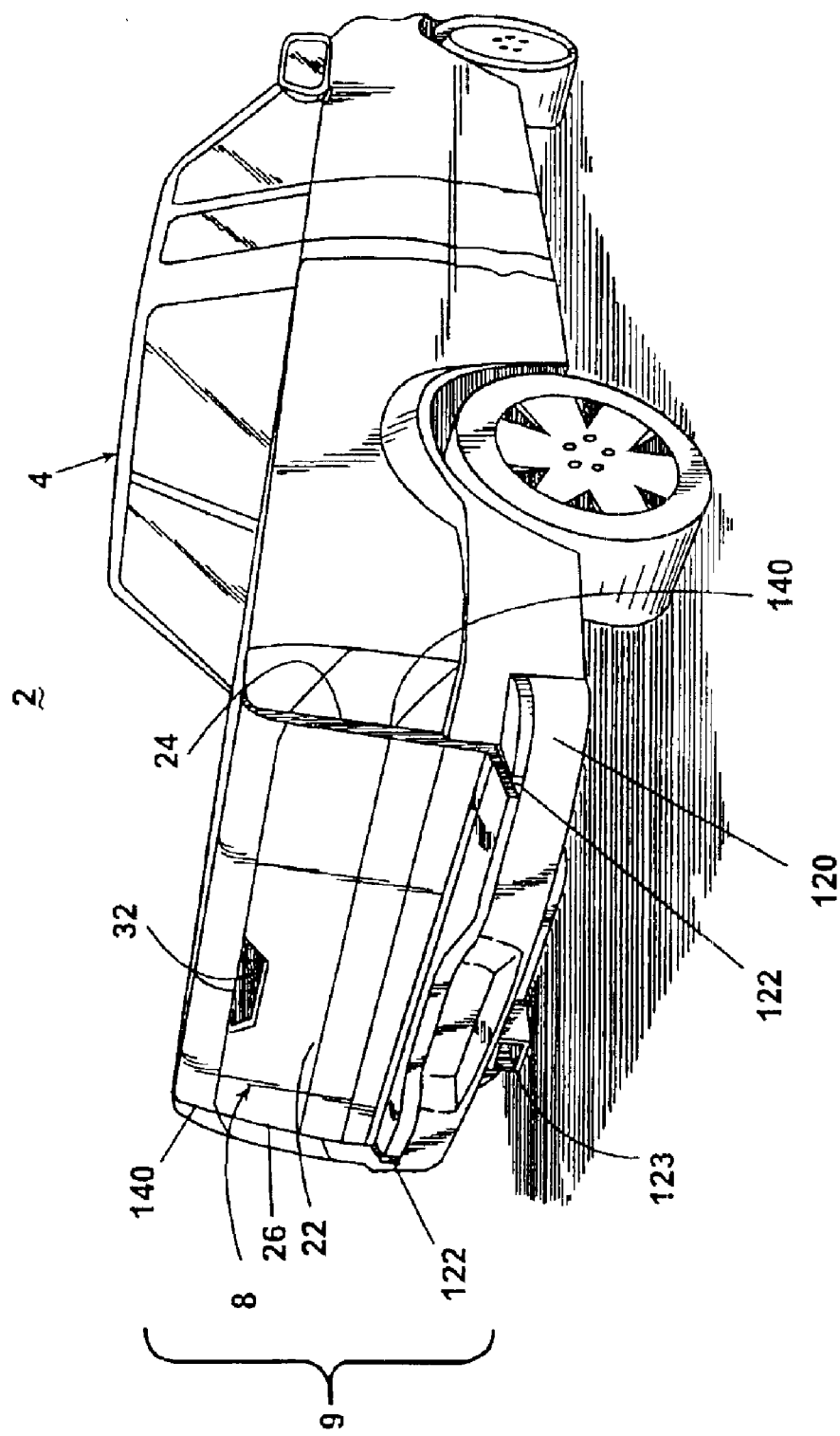
FIG. 1 is a respective view of the combination liftgate/tailgate for a vehicle in a closed position according to the invention.
Figure 2:
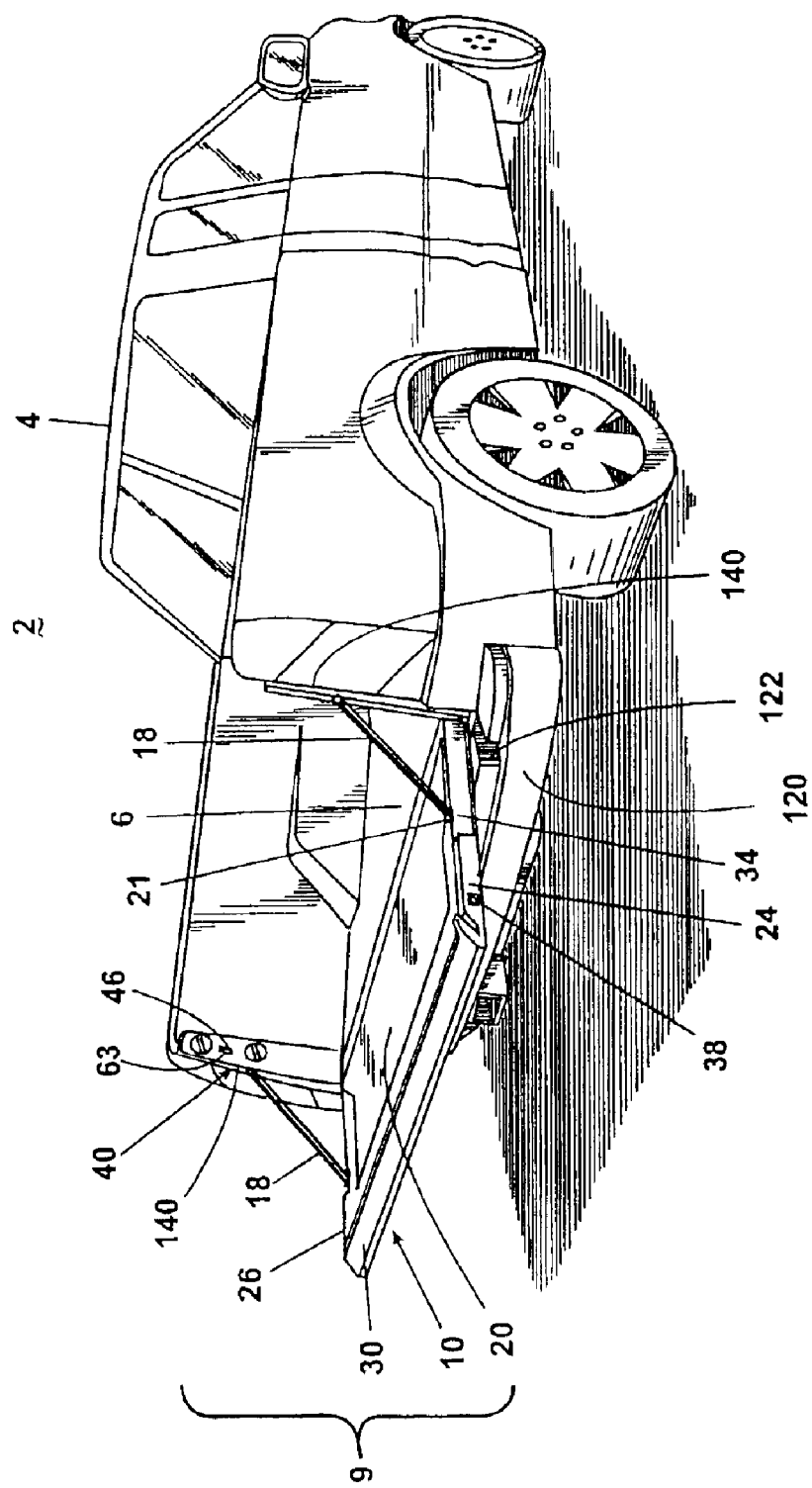
FIG. 2 is a perspective view of the combination liftgate/tailgate assembly of FIG. 1 showing its use as a conventional pickup truck tailgate and as a liftgate in the fully raised position.

Referring to FIGS. 1 and 2, a vehicle 2, such as a pickup truck, comprises a cab 4, a cargo bed 6 having sidewall edges 140 and a tailgate 8 having lateral edges 24 and 26. When closed, the lateral edges 24 and 26 of the tailgate 8 are brought into close proximity to the sidewall edges 140 of the bed 6 so that a rear surface of the pickup truck 22 appears to be unbroken. As described herein, the invention relates to a combination liftgate,tailgate 9 that operates as a tailgate between a closed position and an open tailgate position and as a liftgate to elevate items between a ground surface and the open tailgate position.

Referring to FIGS. 1–3, the combination liftgate/tailgate 9 comprises a platform 10, opposed linkage assemblies 12, and a drive assembly 16. The drive assembly 16 is interconnected to the linkage assemblies 12 by corresponding cables 14. The linkage assemblies 12 are interconnected to the platform 10 by corresponding cables 18.

The platform 10 has an inside surface 20, an outside surface 22, side surfaces having the lateral edges 24 and 26, a bottom surface 28, and a top surface 30, which are combined in a conventional manner by stamping forming, welding, adhesives, or fasteners into a reinforced tailgate. The inside surface 20 is constructed of a suitable material, such as sheet steel, that is capable of supporting a desired payload. The side surfaces 24 and 26 contain linkage recesses 34 adapted to receive the linkage assemblies 12 when the combination liftgate/tailgate 9 is in the closed position. The outside surface 22 is constructed of the same sheet metal as the vehicle exterior, and incorporate styling features complementary to the overall styling of the vehicle. The platform 10 can incorporate additional strengthening members, either interiorly or exteriorly depending upon the properties of the materials used for the inside and outside surfaces, and the desired load-carrying capacity of the liftgate/tailgate 9.

The platform 10 is provided with a conventional tailgate latch 32 accessible via the outside surface 22 which retracts tailgate latch pins 38 into the lateral edges 24 and 26 and enable the liftgate/tailgate 9 to be moved to the open tailgate position. It will be understood that the liftgate/tailgate 9 can be operated by a conventional tailgate lock/release mechanism. The side surfaces 24 and 26 are also provided with anchors 21 for attachment of the tailgate support cables 18, as hereinafter described. the anchors 21 are attached using conventional fasteners to the side surfaces 24 an 26, intermediate a top surface 30 and a bottom surface 28 thereof.

Figure 6:
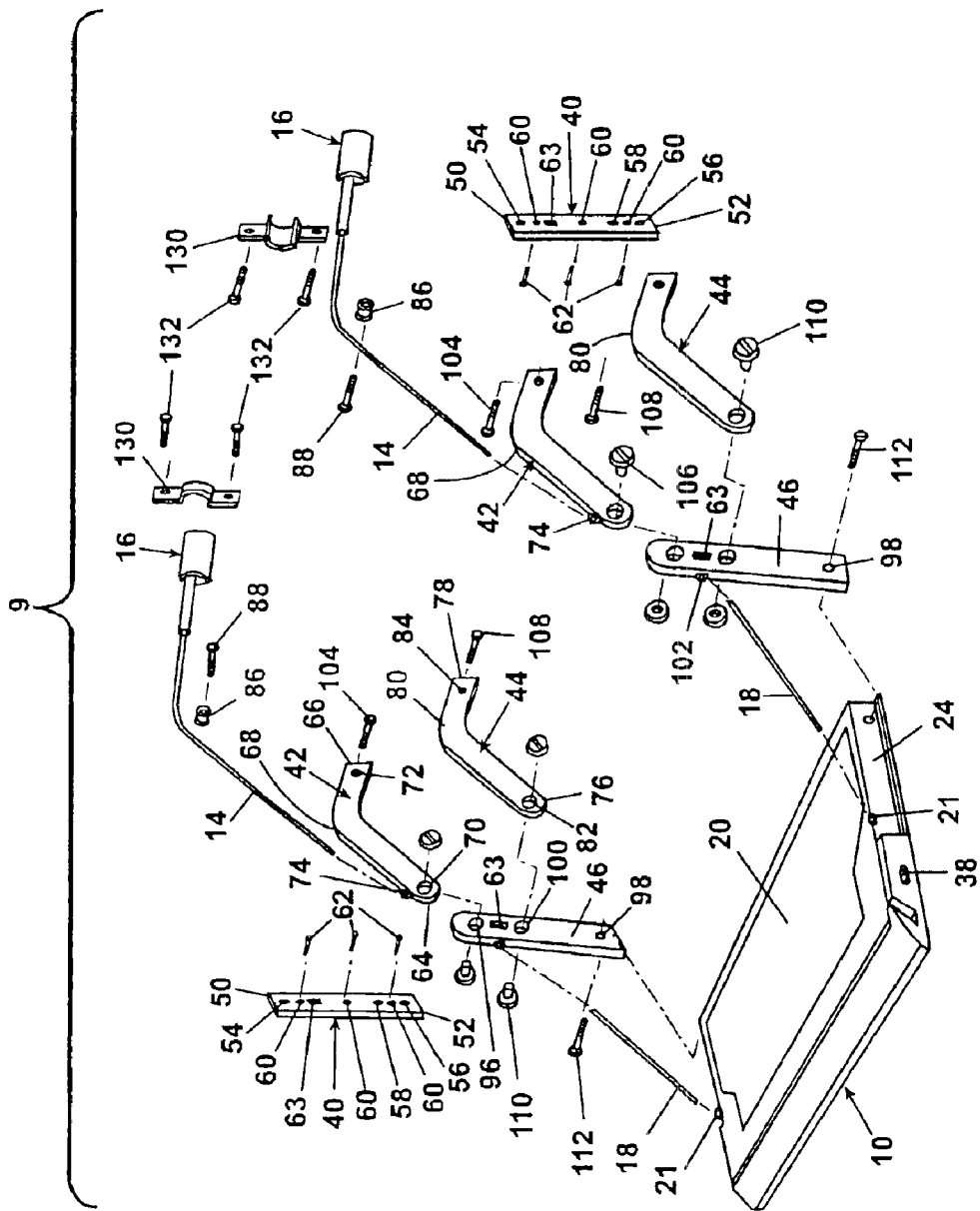
FIG. 6 is an exploded view of the combination liftgate/tailgate assembly of FIG. 1 with substantially all of the vehicle removed for clarity.

FIG. 6 shows an exploded view of one embodiment of a combination liftgate/tailgate including linkage assemblies, each of which comprises a mounting link 40, an upper link 42, a lower link 44, a vertical link 46, and fasteners as hereinafter described. The mounting link 40 is an elongated member having a first end 50 and a second end 52. The mounting link 40 has a series of apertures 54, 56, 58, 60, and 63 thereon. The apertures 54 and 56 are provided adjacent first and second ends 50 and 52, respectively. The aperture 58 is provided on the mounting link 40 intermediate the apertures 54, 56. The aperture 60 are provided in a spaced relationship along the mounting link 40 intermediate the two ends 50, 52 thereof for attaching the mounting link 40 to the sidewall 36 of the truck bed 6 using fasteners 62. The number and location at the apertures 60 will be determined so that the liftgate/tailgate 9 is securely mounted to the vehicle sidewalls 36. Slots 63 can be provided on the mounting link 40 adapted to receive the tailgate latch pins 38 when the liftgate/tailgate 9 is in the closed position.

The upper link 42 is an elongated member having first end 64 and a second end 66. The upper link 42 is provided with a bend 68 intermediate the first and second ends 64 and 66. The first and second ends 64 and 66 are provided with apertures 70 and 72 respectively. The upper link 42 is also provided at the first end 64 with an anchor 74 for attachment of the lifting cable 14, as hereinafter described.

The lower link 44 is a similar elongated member having a first end 76 and a second ends 78. The lower link 44 is provided with a bend 80 intermediate the first and second end 78. The first and second ends 76 and 78 are provided with apertures 82 and 84, respectively.

The vertical link 46 is an elongated member having a first end 92 and a second end 94. The first and second ends 92 and 94 are provided with apertures 96 and 98, respectively. An aperture 100 is provided intermediate and the apertures 96 and 98. The vertical link 46 is also provided with an anchor 102 intermediate the ends 92 and 94 for attachment of the tailgate support cable 18, as a hereinafter described. The vertical link 46 is also provided at its upper end with a slot 63 that is adapted to accommodate the tailgate latch pins 38 in a position in register with the slot 63 on the mounting link 40 when the mounting link 40 is aligned with the vertical link 46.

The second end 66 of the upper link 42 is pivotably mounted to the mounting link 40 by passing a fastener 104 through aligned aperture 58 and 72 thereof. The first end 64 of the upper link 42 is pivotable mounted to the vertical ling 46 by passing a fastener 106 through aligned apertures 96 and 70 thereof.

The second end 78 of the lower link 44 is pivotably mounted to the mounting link 40 by passing a fastener 108 through aligned apertures 54 and 84 thereof. The first end 76 of the lower link 44 is pivotably mounted to the vertical link 46 by passing a fastener 110 through aligned apertures 100 and 110 thereof. The vertical line 46 is pivotably attached through the aperture 98 with the fastener 112 to the side surfaces 24 and 26. The upper link 42 and the lower line 44 may be alternatively mounted directly to the sidewall 36, eliminating the mounting link 40.

The upper link 42 and the lower link 44 are configured and attached to the mounting link 40 and the vertical link 46 so that the inside surface 20 remains parallel to the cargo bed 6 of the vehicle 2 throughout the lifting operation, and the liftgate/tailgate 9 can be closed as a conventional tailgate. The fasteners 104, 106, 108, and 110 are conventional attachments that may include pins, shafts, bearings, or bushings, countersunk as needed, so the connected members are allowed to freely pivot relative to each other.

The aforementioned attachments and pivotal mountings will be dependent upon the magnitude of the load to be lifted and the requirements that the upper link 42 and the lower link 44 remain parallel to each other, that the platform 10 remain in a level position, during operation of the lift, and that the platform 10 not contact the vehicle bumper 120 or a trailer hitch (not shown) as the platform 10 is raised and lowered. Vehicle bumper 120 is provided with cutouts 122 to accommodate linkage assemblies 12 when the platform 10 is in the fully lowered position.

Tailgate support cable 18 is comprised of a suitable material such as steel wire-wound cable, chain, or other material that is flexible, of sufficient strength to support the platform 10 when fully loaded, and of sufficient length to maintain the platform 10 in an orientation level with the cargo bed 6 of the vehicle during its operation as a liftgate. The tailgate support cable 18 is attached to the vertical link 46 intermediate of the ends f the vertical link by the anchor 102, and to the platform 10 by the anchor 21. The anchors 21 and 102 can be any suitable conventional anchoring device, such as an eye bolt, and the support cable 18 can be attached to the anchors by any of several known ways, including with a fastening nut, strap, welding etc.

The drive assembly 16, although can be any known drive motor, can be a conventional 12-volt DC electric motor with a gear-reduction cable drive that is mounted within the sidewalls 36 of the bed 6 using brackets 130 and fasteners 132. The motor 16 is preferably wired into the vehicle's 12-volt electrical system (not shown). A pulley 86 is mounted to the sidewalls 36 using a fastener 88. The lifting cable 14 passes from the motor 16 over the pulley 86 through the aperture 56 and connects to the upper link 42 by the anchor 74. The anchor 74 can be any suitable conventional anchoring device, like the other anchors 21 and 102, and the lift cable 14 can be attached to the anchor by the previously-described conventional methods. The lift cable 14 is extended and retracted by the motor 16 and is controlled by a conventional electric control system, such as by a switch located in the cab 4. Alternatively, controls 142 for operating the liftgate/tailgate 9 can be incorporated into a key fob 144 utilizing radio-control circuitry (FIG. 4) as is well known in the art of remote control devices. A conventional pneumatic or hydraulic driven motor can be employed in place of the electric motor without departing from the scope of the invention.

The operation of the liftgate/tailgate 9 will now be described. When the liftgate/tailgate 9 is in the closed position, the upper link 42, the lower link 44, and the vertical link 46 are brought into generally vertical alignment with the mounting link 40 and are enclosed by the recess 34 of the platform 10. The liftgate/tailgate 9 can be opened as a conventional tailgate by operating the tailgate latch 32, which retracts the tailgate latch pins 38 from the slots 63, which enables the liftgate/tailgate 9 to be rotated down and to the rear by pivoting about an axis defined by the fastener 112. The rotation of the liftgate/tailgate 9 continues until the tailgate support cables 18 are fully extended, and the tailgate is held in the open tailgate position, preferably level with a floor surface of the cargo bed 6. In the open tailgate position shown in FIG. 2, the vertical link 46 is in a generally vertical orientation, parallel to the mounting link 40. The upper link 42 and the lower link 44 remain in a generally vertical position, generally parallel to each other.

Figure 5:
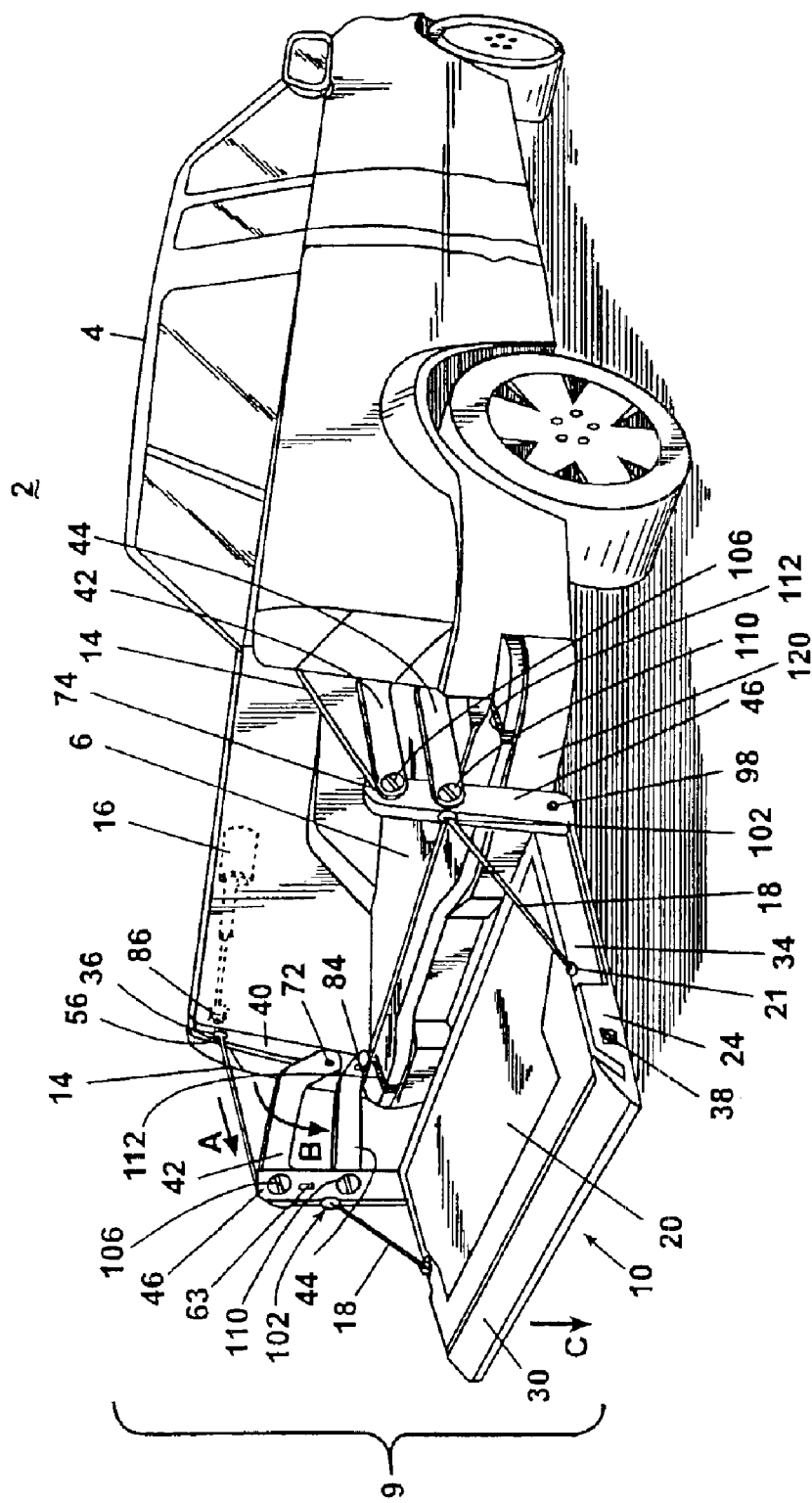
FIG. 5 is a perspective view of the combination liftgate/tailgate assembly of FIG. 1 showing its use as a liftgate in an intermediate position.

When the liftgate/tailgate 9 is to be operated as a liftgate to move the platform 10 between the open tailgate position and a lowered position adjacent to the ground, the control buttons 142 on the key fob 144 are operated to control the extension and retraction of the lifting cable 14. With reference to FIG. 5, the motor plays out the lifting cable 14 (in the direction shown by arrow "A" of FIG. 5), which allows the upper link 42 and the lower link 44 to pivot to the rear and downwardly about the pivotal mountings 104 and 108 (in the direction shown by arrow "B" of FIG. 5) as the platform 10 is lowered (in the direction shown by arrow "C" of FIG. 5). The upper link 42 and the lower link 44 remain generally parallel to each other as they rotate. The upper link 42 and the lower link 44 rotate relative to the vertical link 46 about pivots 106 and 110 and, consequently, the vertical link 46 remains in a generally vertical orientation, parallel to the mounting link 46 remains in a generally vertical orientation, parallel to the mounting link 40. The desired position of the platform 10 is determined by the length of the lifting cable 14 extended by the drive assembly 16 and the angular orientation of the platform 10 is determined by the tailgate cables 18. When the lifting cable 14 is completely played out, the platform 10 is lowered to its lowest position, generally parallel to the cargo bed 6 and preferably adjacent to the ground (FIG. 3).

When the lift cable 14 is taken up by the drive assembly 16, the upper link 42 pivots about the pivot 104 in a forward and vertical direction, with the second end 64 transcribing a generally circular arc as the upper link 42 is rotated upward. At the same time, the lower link 44 rotates in an upward and forward direction about the pivot 108, with the second end 76 transcribing a generally circular arc as the lower link is rotated upward. The platform 10 is elevated to a position generally level with the cargo bed 6 of the pickup truck 2 while remaining in a position substantially parallel to the cargo bed 6. When the platform 10 is lifted to the fully elevated position level with the cargo bed 6 of the truck 2, the vertical link 46 is preferably parallel and adjacent to the mounting link 40. The upper link 42 and lower link 44 are in a generally parallel orientation, adjacent to the vertical link 46 and mounting link 40, with the vertical link, the upper link, and the lower links 42, 44, and 46 returned to within the recess 34. The platform 10 can then be closed by pivoting the platform about the pivots 98 so that the tailgate latch pins 38 re-engage within the slots 63.

Referring now to FIGS. 7–16, an alternative embodiment 109 of the invention will now be described. In this embodiment, the power supply is mounted beneath the vehicle and the liftgate is operated by a pair of hydraulic pistons.

Figure 7:
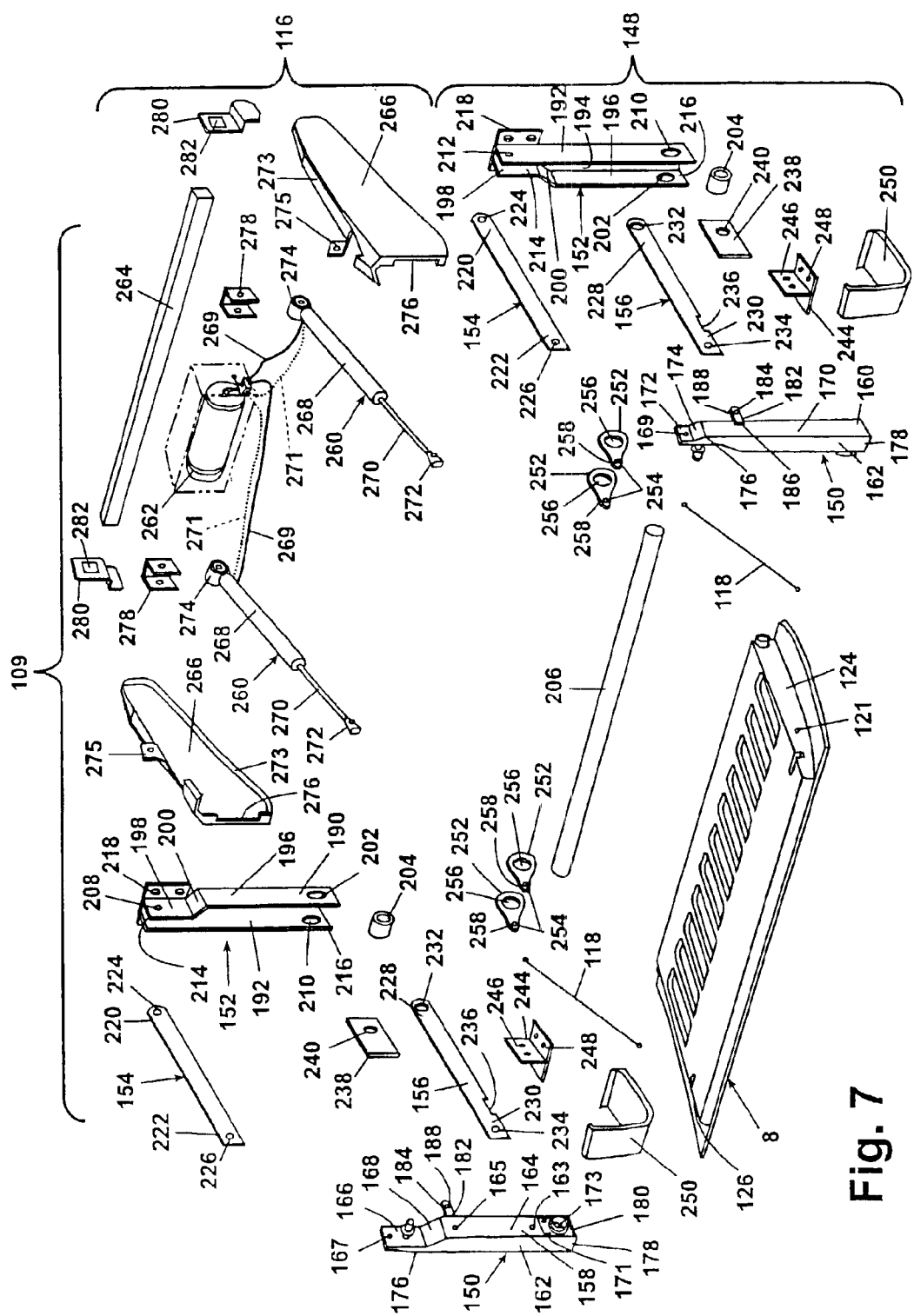
FIG. 7 is an exploded view of an alternative embodiment of the combination liftgate/tailgate assembly of FIG. 1.
Figure 8:
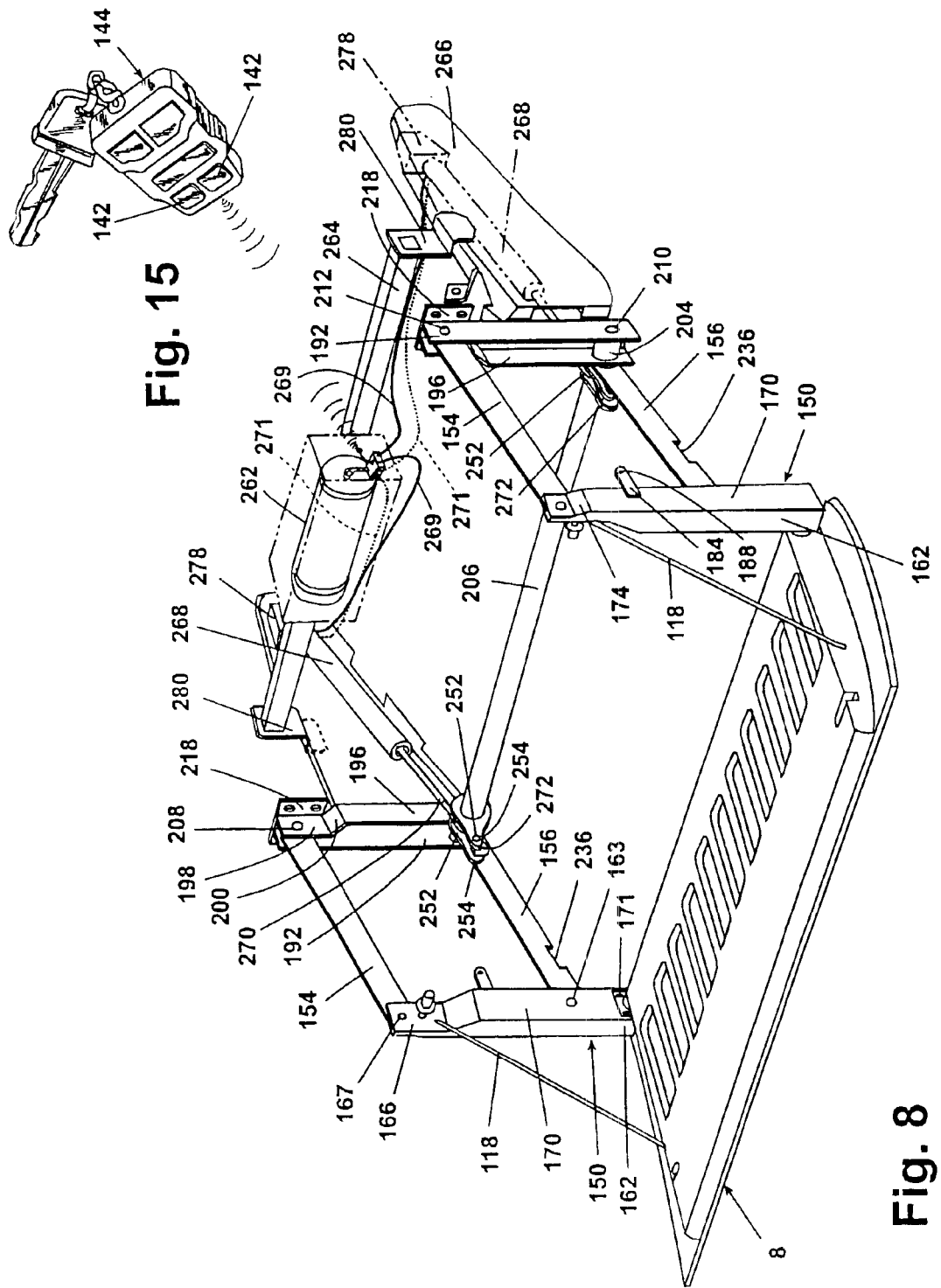
FIG. 8 is a perspective view of the alternative embodiment of FIG. 7 in an assembled configuration.
Figure 9:
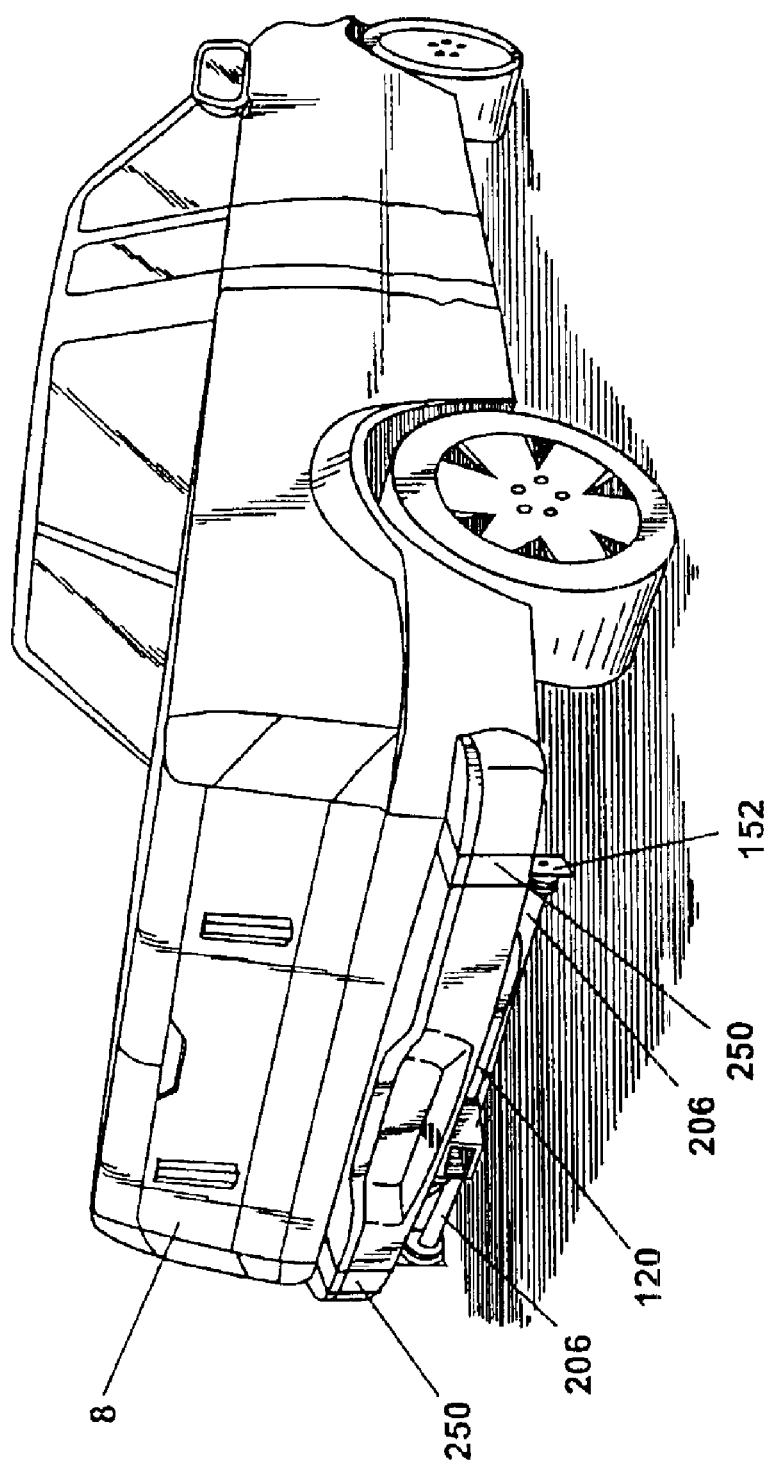
FIG. 9 is a perspective view of the combination liftgate/tailgate assembly of FIG. 7 mounted on a conventional pickup truck tailgate and in a closed position.

Referring now to FIGS. 7 and 8, the alternative embodiment 109 of the invention comprises a liftgate/tailgate 8 generally as previously described, a linkage assembly 148, and a power actuating assembly 116 with a mounting assembly 264, 266 for mounting the power actuating assembly 116 to the underside of the vehicle 2. The linkage assembly 148 is mounted to either end of the liftgate/tailgate 8. Each linkage assembly 148 is a mirror image of the other, but is identical to the other in every respect. Thus, only one linkage assembly will be described.

Figures 10, 11:
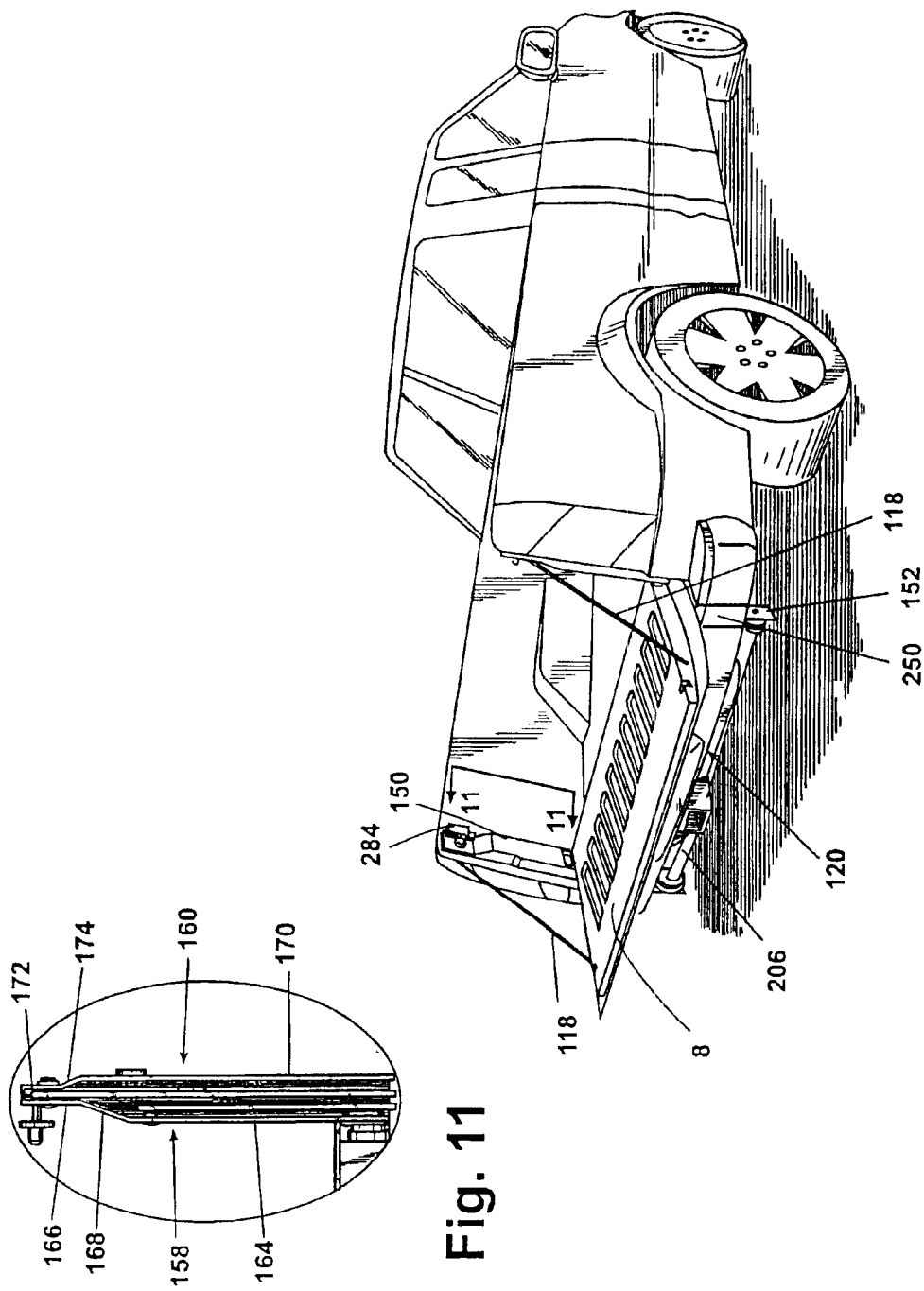
FIG. 10 is a perspective view of the combination liftgate/tailgate assembly of FIG. 7 showing its use as a conventional pickup truck tailgate and as a liftgate in the fully raised position.
FIG. 11 is a detailed view of the vertical leg of the combination liftgate/tailgate of FIG. 7 showing positions of an upper link and a lower link when the liftgate is in a fully raised position.
Figure 12:
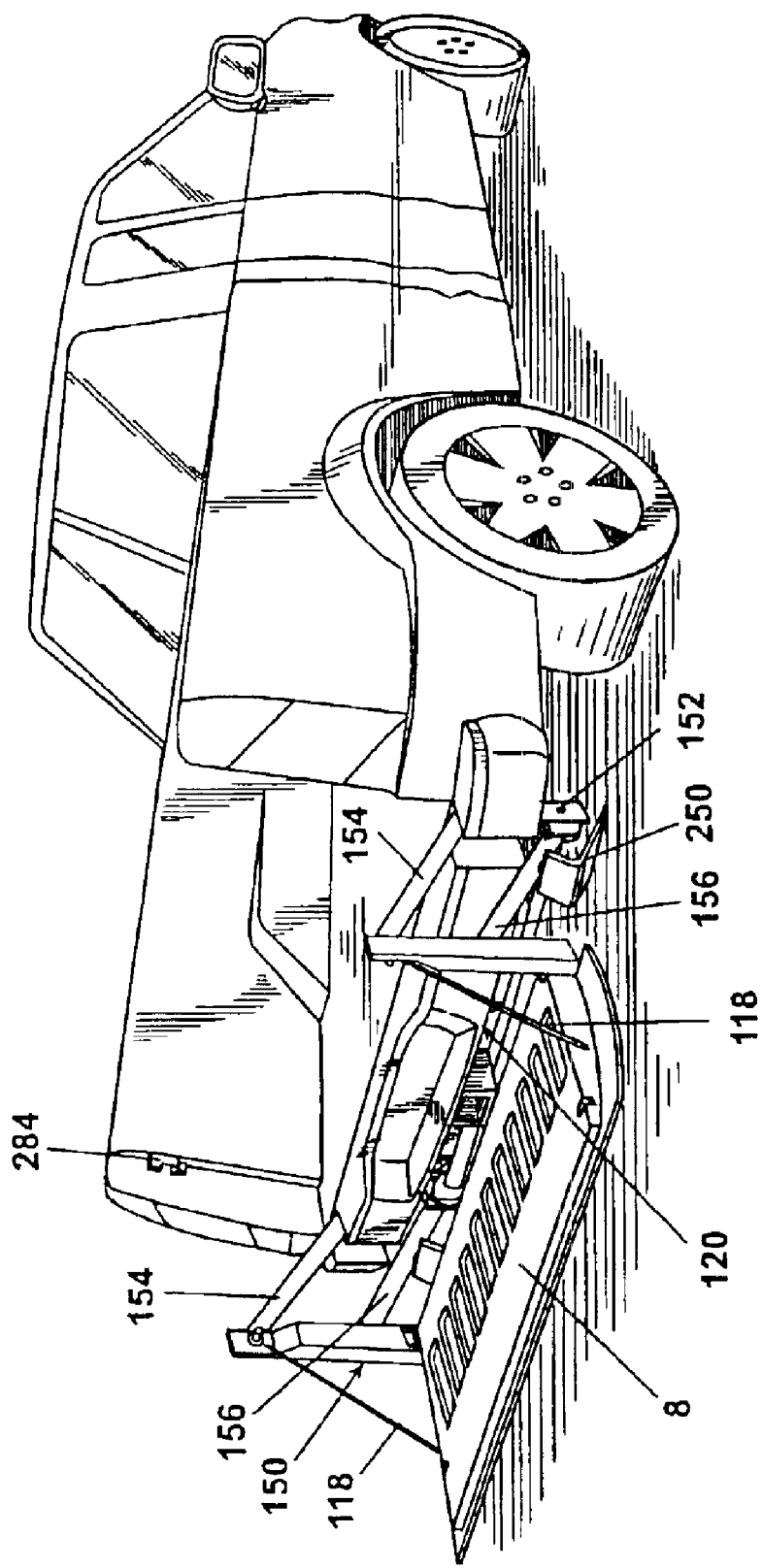
FIG. 12 is a perspective view of the combination liftgate tailgate assembly of FIG. 7 showing the liftgate in an intermediate position (between the fully raised position and a fully lowered position)

Each linkage assembly comprises a vertical leg 150, a mounting leg 152, an upper link 154, and a lower link 156. The vertical leg 150 is an elongated member with an inner face 158, an outer face 160, and a connecting plate 162 forming a three-sided channel piece with an open side. Referring also to FIG. 11, the inner face 158 is comprised of a lower plate 164, an upper plate 166, and a bevel plate 168 interconnecting the two along a vertical direction. The plates 164–168 are rigidly connected, preferably by welding. The bevel plate 168 is inclined from the plane of the lower plate 164 and the plane of the upper plate 166 to form a bevel portion between the lower plate 164 and the upper plate 166. The lower plate 164 has an aperture 163 for receiving a conventional bolt or pin for pivotally connecting the lower link 156 to the vertical leg 150 as hereinafter described. The upper plate 166 has an aperture 167 for receiving a conventional bolt or pin for pivotally connecting the upper link 154 to the vertical leg 150 as hereinafter described. The lower plate 164 has an aperture 165 for receiving a conventional bolt or pin for pivotally connecting a tailgate cable 118 to the vertical leg 150.

The outer face 160 is comprised of a lower plate 170, an upper plate 172, and a bevel plate 174. The plates 170–174 are rigidly connected, preferably by welding. The bevel plate 174 is inclined from the plane of the lower plate 170 and the plane of the upper plate 172 to form a bevel portion between the lower plate 170 and the upper plate 172. The upper plate 172 has an aperture 160 that extends through the upper plate 172 and the upper plate 166 for receiving a conventional bolt or pin for pivotally connecting the upper link 154 to the vertical leg 150 as hereinafter described. The aperture 167 is axially aligned with the aperture 169 for receipt of the bolt or pin there through. The vertical leg 150 defines an upper end 176 and a lower end 178.

The shape of the connecting plate 162 corresponds to the profile defined by the inner face 158 and the outer face 160 at opposed outer vertical edge thereof. The connecting plate 162 is rigidly and orthogonally attached to the inner face 158 and the outer face 160, preferably by welding. The upper end 176 of the vertical leg 150 thus narrows to a throat portion where the upper plate 166 is in close proximity to the upper plate 172.

A bearing 180 for pivotally receiving the liftgate/tailgate 8 as hereinafter described comprises a flange 171 and socket 173. The socket 173 is rigidly attached to the flange 171, preferably by welding. The flange 171 is fixedly attached to the lower plate 164 at the lower end 178 of the vertical leg 150, preferably by welding or a conventional bolted connection. The liftgate/tailgate 8 can thus pivot between a vertical position and a horizontal position with respect to the vertical leg 150.

A tailgate latch finger 182 is a generally flat, elongated piece with a first end 184 and a second end 186. The first end 184 has a pin aperture 188 there through. The second end 186 is rigidly attached, preferably by welding, to the upper plate 170 near the upper end 176 of the vertical leg 150 so that the latch finger 182 is extended orthogonally to the vertical leg 150 toward the bed of the vehicle.

The mounting leg 152 is an elongated member with an inner face 190, an outer face 192, and a connecting plate 194 forming a three-sided channel piece with the open side. The inner face 190 is comprised of a lower plate 196, an upper plate 198, and a bevel plate 200.

The plates 196–200 are rigidly interconnected, preferably by welding. The bevel plate 200 is inclined fro the plane of the lower plate 196 and the plane of the upper plate 198 to form a bevel portion between the lower plate 196 and the upper plate 198. The lower plate 196 has an aperture 202 for receiving a bearing 204 for pivotally mounting a connecting bar 206 to the mounting leg 152 as hereinafter described. The upper plate 198 has an aperture 208 for receiving a conventional bolt or pin for pivotally connecting the upper link 154 to the mounting leg 152 as hereinafter described. The outer face 192 has an aperture 210 that is axially aligned with the aperture 202, and an aperture 212 that is axially aligned with the aperture 208.

The plates 190–194 are rigidly connected, preferably by welding. The mounting leg 152 defines an upper end 214 and a lower end 216. The shape of the connecting plate 194 corresponds to the shape defined by the inner face 190 and the outer face 192. The connecting plate 194 is rigidly and orthogonally attached to the inner face 190 and the outer face 192, preferably by welding. The upper end 214 of the mounting leg 152 thus narrows to a throat portion where the upper plate 198 is in close proximity to the outer face 192. A mounting flange 218 comprises a flat plate that is rigidly attached to the connecting plate 194 at the upper end 214 of the mounting leg 152 the mounting flange 218 is provided with apertures for attaching the mounting leg 152 to the frame of the vehicle with bolted connections as hereinafter described. Alternatively, the flange 218 can be provided without apertures and welded to the frame of the vehicle.

The upper link 154 is a generally flat, elongated member with a first end 220 and a second end 222. The first end 220 is provided with an aperture 224, and the second end 222 is provided with an aperture 226. The lower link 156 is a generally flat, elongated member with a first end 228 and a second end 230. The first end 228 is provided with an aperture 232, and the second end 230 is provided with an aperture 234. Intermediate the two ends 228, k230 of the lower link 156 a notch 236 is formed in the lower edge of the link 156.

A reinforcing plate 238 comprises a generally flat piece of the same width as the lower link 156. The reinforcing plate 238 is provided with an aperture 240 of the same diameter as the aperture 232 in the lower link 156 and the bar 206. In the preferred embodiment, the reinforcing plat 238 is welded to the lower link 156 so that the apertures 232, 240 are in axial alignment.

A bumper bracket 244 is a generally T-shaped member comprised of a link plate 246 and a bumper plate 248. The link plate 246 is orthogonal to the bumper plate 248, and is attached to the bumper plate 248 by welding. The plates 246, 248 are provided with apertures to accommodate conventional bolted connections by which he link plate 246 is connected to the lower link 156 and the bumper plate 248 is attached to a bumper insert 250. Alternatively, the bumper plate 248 can be attached to the bumper insert 250 by welding.

A connecting bar 206 comprises a round bar for connecting and operating the linkage assemblies as hereinafter described. Bar flanges 252 comprise generally flat circular plates with an integral ear 254. The flanges 252 are provided with an aperture 256 to receive the bar 206. The ear 254 has an aperture 258 to receive a pin or bolt as hereinafter described.

The hydraulic power assembly comprises conventional hydraulic piston and cylinder actuators 260, a conventional hydraulic power supply 262 comprising a hydraulic fluid reservoir and actuator for controlling the delivery of hydraulic fluid to the piston and cylinder actuators 260, a mounting bar 264, and actuator covers 266. The hydraulic piston and cylinder actuators 260 comprise a cylinder portion 268, a piston rod 270 axially mounted in the cylinder 268, a piston rod connector 272, and a mounting busing 274 connected to the end of the cylinder portion 268. In the preferred embodiment, the hydraulic piston and cylinder actuators 260 are fluidly connected to the hydraulic power supply 262 by hydraulic lines 269, 271 through conventional hydraulic fittings.

The mounting bar 264 is an elongated member with a square cross-section suitable for fixedly mounting the hydraulic power supply 262 thereto. The actuator covers 266 are generally irregularly-shaped planar members having a peripheral lip 273 and mounting flanges 275. A notch 276 is formed in the lip 273 at the rear portion of the cover 266.

A cylinder clevis 278 is mounted to the interior surface of the actuator cover 266 for mounting the actuators 260 to the covers 266. The mounting busing 274 is pivotally connected to the cylinder clevis 278 such as by a conventional pinned or bolted connection. The piston rod 270 extends through the notch 276 and is operably connected to the bar flange 252 as hereinafter described. Mounting bar brackets 280 are provided with square apertures 282 into which is inserted the mounting bar 264. One mounting bar bracket 280 is fixedly attached, preferably by welding, to each end of the mounting bar 264. One mounting bar bracket 280 is fixedly attached, preferably by welding, to each end of the mounting bar 264. Each mounting bracket 280 is fixedly attached, preferably by welding to a corresponding actuator cover 266. The hydraulic power supply 262 is rigidly attached to the mounting bar 264 midway between the two actuator covers 266. The actuator covers 266, with attached piston and cylinder actuators 260, and hydraulic power supply 262, are fixedly attached to the underside of the vehicle by conventional welded or bolted connections.

Referring now to FIG. 8, the linkage assembly is assembled as follows. The upper link 154 is pivotally attached to the vertical leg 150 by a conventional pin or bolt fastener passing through the apertures 167, 169 in the vertical leg and the aperture 226 in the upper link 154 is pivotally attached to the vertical leg 150 by a conventional pin or bolt fastener passing through the apertures 167, 169 in the vertical leg and the aperture 226 in the upper link 154. The upper link 154 is pivotally attached to the mounting leg 152 by a conventional pin or bolt fastener passing through the apertures 208, 212 in the mounting leg 152 and the aperture 224 in the upper link 154. The lower link 156 is pivotally attached to the vertical leg 150 by a conventional pin or bolt fastener passing through the aperture 163 in the vertical leg 150 and the aperture 234 in the lower link 156.

The bearings 204 are inserted through the apertures 202, 210 in the mounting legs 152 and are fixedly retained therein, preferably by welding. The connecting bar 206 is pivotally retained in the bearings 204 and rotates therein. The lower link 156 with attached reinforcing plate 238 is fixedly connected to the connecting bar 206 is pivotally retained in the bearings 204 and rotates therein. The lower link 156 with attached reinforcing plate 238 is fixedly connected to the connecting bar 206 adjacent to the mounting leg 152, preferably by welding. The bar flanges 252 are fixedly mounted to each end of the connecting bar 206, preferably by welding, adjacent to the lower link156. The bar flanges 252 are spaced to accommodate the piston rod connector 272, which is pivotally connected to the bar flanges 252 by a conventional pin or bolt connection passing through the apertures 258 in the ears 254 and the piston rod connector 272. Referring now to FIG. 14, the lower link 156 and bar flanges 252 are connected to the connecting bar 206 so that when the piston rod 270 is fully extended, and the ears 254 are at their most rearward position, the lower link 156 will have rotated to its lowest position, thus moving the liftgate/tailgate 8 to its lowest position.

The mounting legs 152 are mounted to the rear of the vehicle, such as by welding or bolting the flanges 218 to the frame. A portion of the rear of the vehicle, such as by welding or bolting the flanges 218 to the frame. A portion of the rear bumper 120 corresponding to the linkage assemblies 148 is cut out to enable the mounting of the mounting legs 152. The lower portion of each mounting leg 152 is also rigidly attached, preferably by welding, to a corresponding actuator cover 266 along the rearward facing lip of the cover 266. Referring now to FIG. 13, the mounting legs 152 are mounted to the rear of the vehicle through cutouts in the bumper 120 for this purpose. The bumper cover 250 are connected through the bumper brackets 244 to the lower links 156 so that when the liftgate/tailgate 8 is in its fully raised position, the bumper covers 250 will be positioned within the bumper cutouts to provide the appearance of an unbroken bumper.

Alternatively, it will be understood that the bumper could be provided as a single unitary member without the separate covers 250 and simply be mounted as a unit to the linkage assembly so that the bumper would move out of obstruction of the movement of the tailgate with the movement of the linkage assembly.

Referring again to FIGS. 13 and 16, a tailgate retainer block 284 comprises a generally blocklike structure with an extension 286. The retainer block 284 has a first side with a laterally extending channel 288 cut therein, and a second side with a circular passageway 290 extending from the second side through the block to the channel 288. The passageway 290 is axially aligned with the aperture 188 in the locking tab 184 within the channel 288 when the liftgate/tailgate 8 is in its raised closed position. A pin 292 is inserted into the circular passageway 290 and through the aperture 188 in the locking tab 184 to secure the liftgate/tailgate 8 against vibration while the vehicle in motion.

The operation of the liftgate/tailgate will now be described with reference to FIGS. 9–14. When the liftgate/tailgate 8 is in its upright and closed position, the tailgate has the appearance of a conventional pickup trunk tailgate. The bumper covers 250 are positioned within the bumper cutouts to provide the appearance of an unbroken bumper surface. The tailgate may be operated in a conventional manner to gain access to the bed of the vehicle. Referring specifically to FIG. 10, the tailgate is retained in the open position by the cables 118 in a conventional fashion. When it is desired to operate the lift gate, the pin is removed from the retaining block 284, if necessary. Operating the controls to lower lift gate will result in the piston rod 270 being extended toward the rear of the vehicle. This will rotate the bar flanges 252 in a rearward direction which will correspondingly rotate the lower link 156 in a rearward and downward direction. At the same time, the upper link 154 will be rotated in a rearward and downward direction, thus lowering the liftgate/tailgate 8. The length of the upper and lower links 154, 156, and of the vertical leg 150n and mounting leg 152, which form a parallelogram structure, maintains the liftgate/tailgate 8 in a generally horizontal orientation during the lifting and lowering operation.

When the liftgate/tailgate 8 is to be raised the controls will be actuated to retract the piston rod 270, thus rotating the bar flanges 252 toward the front of the vehicle. The lower link 156 will be correspondingly rotated in a forward and upward direction, thus raising the liftgate/tailgate 8. When the liftgate/tailgate 8 has been returned to its fully raised position, the pin can be replaced in the retaining block 284 and the tailgate returned to a closed position. Referring the FIG. 15, the controls can be mounted within a key fob 144 provided with control buttons 142 to actuate the hydraulic power supply 262. Alternatively, conventional hydraulic controls (not shown) can be provided.

Referring now to FIGS. 17–19, a second alternative embodiment liftgate/tailgate 309 of the invention will now be described. In this embodiment, as in the first embodiment, both the assembly and the power supply are mounted to the upper part of the vehicle and the liftgate. A similar structure, involving four legs or links, is used. In this embodiment, however, the liftgate is operated by a cable motor 314 and cable 316 operated with the power supply.

Referring now to FIG. 17, the alternative embodiment combination liftgate/tailgate 309 comprises the platform 10, one or more linkage assembly 312, and a cable motor 314 and cable system.

Referring to FIG. 18, the linkage assembly 312 comprises a mounting link 340, an upper link 342, a lower link 344, a vertical link 346, and fasteners as hereinafter described. The mounting link 340 is an elongated member having a first end 350 and a second end 352. The mounting link has a series of apertures 354, 356 for attaching cable pulleys 362. The mounting link 340 also has a series of apertures at positions 358, and 360 thereon in a spaced relationship along the mounting link 340 intermediate the two ends 350, 352 thereof for attaching the mounting link 340 to the sidewall 36 of the truck bed 6 using fasteners (not shown).

The upper link 342 is an elongated member having first end 364 and a second end 366. The first and second ends 364 and 366 are provided with apertures (not shown) for pivotably mounting the upper link 342 to the vertical link 346 and the mounting link 340, respectively, using fasteners, at positions 392 and 358 respectively.

The lower link 344 is a similar elongated member having a first end 376 and a second end 378. The lower link 344 is provided with a bend 380 intermediate the first and second end 376 and 378. The first and second ends 376 and 378 are provided with apertures for pivotably mounting the lower link to the vertical link 346 and the mounting link 340 at position 360, using fasteners. The upper link 342, the lower link 344, and the pulleys 362 may be alternatively mounted directly to the sidewall 36, eliminating the mounting link 340.

The vertical link 346 is an elongated member having a first end 392 and a second end 394. An aperture is provided at the first end 392 for pivotably mounting the upper link 342 and pulley 364 using a fastener. An aperture is also provided intermediate the first end 392 and the second end 394 for pivotably mounting the lower link 344 using a fastener. The vertical link 346 is also provided with an anchor 302 intermediate the ends 392 and 394 for attachment of the hydraulic pistons 319, as a hereinafter described. The vertical link 346 also comprises a telescoping portion 400 which incorporates one or more hollow sleeves 402, 404, 406 that are graduated in size such that the outside diameter of each sleeve is slightly smaller than the inside diameter of the next sleeve, so that they can slide within each other. The innermost sleeve 406 can optionally be either hollow or solid. The bottom end of the innermost sleeve 406 forms the second end 394 of the vertical link 346. The second end 394 of the vertical link 346 has a pivotable fastener or hinge 412 to which the tailgate 10 is mounted.

The upper link 342 and the lower link 344 are configured and attached to the mounting link 340 and the vertical link 346 so that the inside surface 20 remains parallel to the cargo bed 6 of the vehicle 2 throughout the lifting operation, and the liftgate/tailgate 309 can be closed as a conventional tailgate. The fasteners may be fasteners as hereinbefore described (e.g., fasteners 104, 106, 108, and 110).

The aforementioned attachments, pivotal mountings, and hydraulic pistons, cable motor 314, and cable 316 will be dependent upon the magnitude of the load to be lifted and the requirements that the upper link 342 and the lower link 344 remain parallel to each other, that the platform 10 remain in a level position, during operation of the lift, and that the platform 10 not contact the vehicle bumper 120 or a trailer hitch (not shown) as the platform 10 is raised and lowered The cable 316 is mounted at its forward end to the cable motor 314 which, in turn, is mounted to the truck bed. The cable is also mounted, at the rearward end, by any suitable means, as hereinbefore described, to the liftgate 309.

The operation of the liftgate 309 will now be described. When the liftgate/tailgate 9 is in the closed position, the upper link 342, the lower link 344, and the vertical link 346 are brought into generally vertical alignment with the mounting link 340, as shown in FIG. 19, and are enclosed by the recess 43 of the platform 10. The liftgate/tailgate 309 can be opened as a conventional tailgate by operating the tailgate latch 32, which retracts the tailgate latch pins 38 from the slots in, optionally, the truck bed or one or more of the linkages 312, which enables the liftgate/tailgate 9 to be rotated down and to the rear by pivoting about an axis defined by the fastener 412. The rotation of the liftgate/tailgate 9 continues until the tailgate support cables 318 are fully extended, and the tailgate is held in the open tailgate position, preferably level with a floor surface of the cargo bed 6. In the open tailgate position, the vertical link 346 is in a generally vertical orientation, parallel to the mounting link 340. The upper link 342 and the lower link 344 remain in a generally vertical position, generally parallel to each other.

When the liftgate/tailgate assembly 309 is to be operated as a liftgate to move the platform 10 between the conventional open tailgate position and a lowered position adjacent to the ground the cable motor 314 is operated to extend cable 216 which is routed through pulleys 362, 364 on the mounting link and vertical link, respectively. Additional pulleys 414 mounted to the truck bed or chassis may also be used to route the cable. Extending the cable will rotate the upper and lower links, 342 and 344, respectively in a horizontal (rearward) direction, thus translating the vertical link 346 horizontally and, optionally, vertically, along with the liftgate/tailgate 8. The length of the upper and lower links 342, 344, and of the vertical link 346 and mounting link 340 (if present), which form a parallelogram structure, maintains the liftgate/tailgate 8 in a generally horizontal orientation during the lifting and lowering operation. The telescoping portion 400 of the vertical link 346 is then actuated to extend the vertical link 346 and further lower the liftgate/tailgate 8 towards the ground while keeping the platform 10 in a substantially horizontal plane. The fully extended vertical link 346 in the liftgate lowered position is shown in FIG. 18.

When the liftgate/tailgate 8 is to be raised the controls will be actuated to retract the cable, thus retracting first the telescoping portion 400 of the vertical link 346. Thus, once the telescoping portion 400 of the vertical link 346 is fully retracted, upper link 342 and lower link 346 are rotated in a forward and upward direction, thus translating the liftgate/tailgate 8 horizontally forward. When the liftgate/tailgate 8 has been returned to its fully raised and horizontally translated position, the tailgate/liftgate can be returned to a closed position. The controls can be mounted within a key fob 144 provided with control buttons 142 to actuate the cable motor 314. Alternatively. conventional cable motor controls (not shown) can be provided. Although the vertical links herein are described as such, they need not be vertical per se, but can substantially vertical. I.e., they can deviate by as much as 30 degrees from vertical as long as they maintain the object to be lifted on the platform. Furthermore, the vertical link need only be substantially vertical when the tailgate/liftgate is in the lowered position. Finally, the entire link need not be vertical, but must have some substantially vertical component when the tailgate/liftgate is in the lowered position, e.g., it can also be L-shaped or J-shaped.

Figure 20:
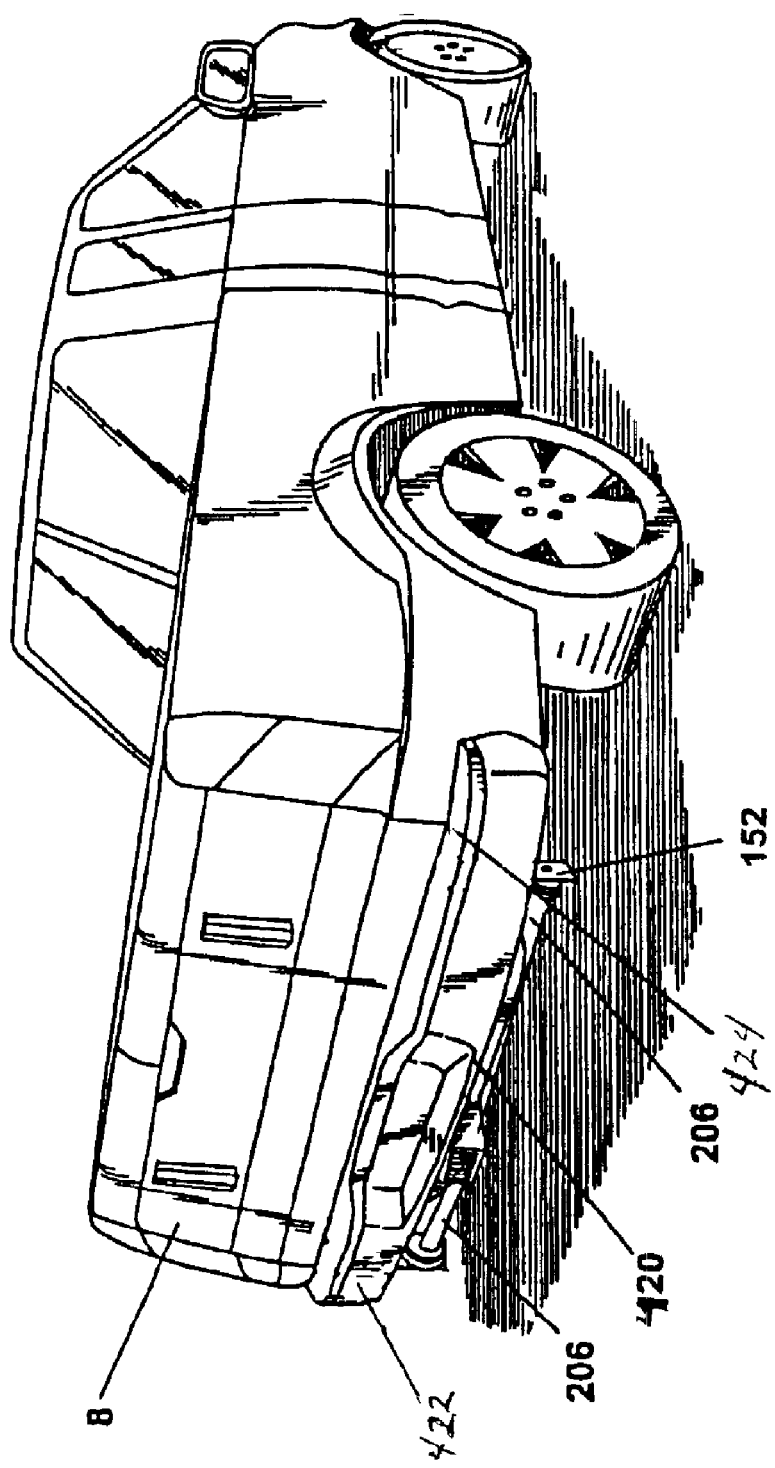
FIG. 20. shows a variation of the liftgate embodiment shown in FIGS. 7–11 in a closed position.
Figure 21:
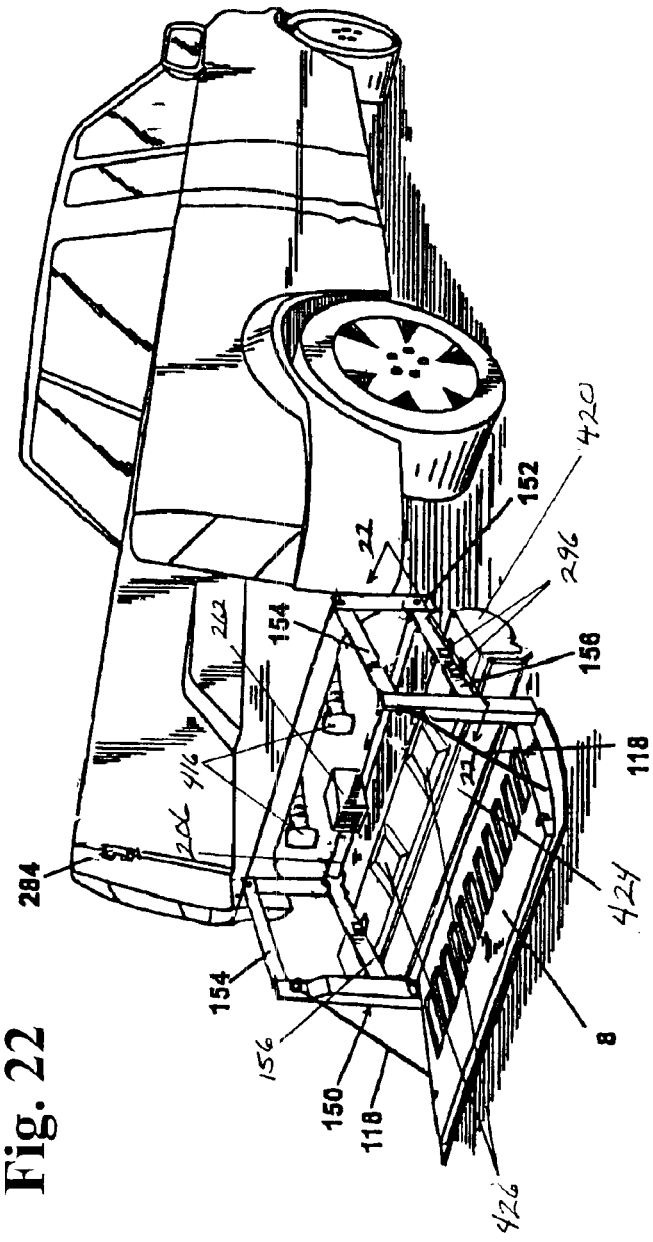
FIG. 21 shows the embodiment variation in FIG. 20 in the liftgate lowered position.
Figure 22:
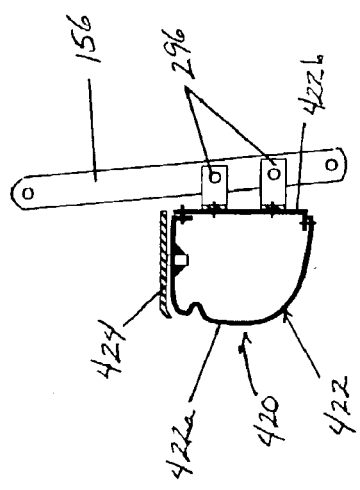
FIG. 22 is a cross-section taken along the line 22—22 in FIG. 21.

Referring now to FIGS. 20–22, a variation of the embodiment liftgate/tailgate shown in FIGS. 7–11. In this embodiment, however, the liftgate is operated by a hydraulic power supply and the bumper is a single unitary member, mounted as a unit to the linkage assembly so that the bumper moves out of the way of the tailgate and linkage assembly with the movement of the linkage assembly.

FIG. 20 shows the liftgate/tailgate in the closed position. In this position, the rear of the liftgate/tailgate looks generally like a conventional pick-up truck tailgate. Bumper 420 appears to be a single unitary bumper beam 422 and a step plate 424 mounted on top.

In this embodiment, the hydraulic power supply 262 rotates connecting bar 206 which, in turn rotates both lower links 156 in a rearward and downward direction. Linkages between vertical legs 150, lower links 156 and upper links 154 operate the same as described above in connection with FIGS. 7–11 to lower and raise liftgate/tailgate 8.

Bumper 420 is mounted by brackets 296 to lower links 156. As the liftgate/tailgate 8 is lowered, the lower links 156 swing out and down away from the truck, causing bumper 420 to swing down and away from the rear of the truck as well to the position shown in FIG. 21.

FIG. 22 shows a cross-section of the bumper 420 mounted to the lower link 156 taken along the line 22—22 in FIG. 21 with the orientation where the liftgate/tailgate is in the closed position. The bumper beam 422 is comprised of a B-shaped section 422a and a back portion 422b typically attached by rivets or welds. Bumper 420 is mounted to brackets 296 via this back portion 422a of bumper beam 422.

Bumper 420 has frame contact pads 426 mounted on the back portion 422a of bumper beam 422. These frame contact pads 426 may be of metal, or any other material. Pads 426 are oriented so that they abut frame rails 416 when the liftgate/tailgate is in the closed position. Frame rails 416 are in turn mounted to the chassis of the vehicle. Thus, the frame contact pads 426, frame rails 416 and the bumper 420 form part of the crush absorbing structure to protect against impacts when the liftgate/tailgate is in the closed position. Pads 426 and frame rails 416 may also interlock so as to provide additional side impact protection.

The combination liftgate/tailgate thus provides several distinct advantages over the prior art. The liftgate/tailgate incorporates and maintains the aesthetics and styling of the vehicle, avoiding the undesirable appearance of commercial lifts. The liftgate/tailgate working components can be partially or completely hidden from view. The liftgate/tailgate can, therefore be utilized in non-commercial vehicles with enhanced acceptance by consumers.

The compact lifting mechanism maximizes the usable space in the cargo bed. It enables non-commercial consumers to easily transport medium-weight household and garden items, and expands the usefulness of light-duty trucks for non-commercial uses. Further, the liftgate/tailgate apparatus can use a conventional tailgate, conserving expense and also conserving the look of the vehicle. The liftgate/tailgate also allows rear impact protection to be mounted on the vehicle, and, in some embodiments, allows the complete bumper to be mounted on the vehicle or the liftgate/tailgate working components.

Finally, the controls may be incorporated into a key fob and thus readily accessible and easy to operate.

While the invention has been specifically described in connection with certain specific embodiments thereof, it is to be understood that this is by way of illustration and not of limitation and the scope of the appended claims should be construed as broadly as the prior art will permit:

We claim:

1. A liftgate/tailgate assembly for a vehicle having a chassis and a cargo area, such cargo area comprising a bed and one or more vertical sidewalls mounted to the vehicle chassis, such liftgate/tailgate assembly comprising (a) a tailgate which, when rotated into an open tailgate position, forms a liftgate/tailgate platform to support a load to be lifted;

(b) one or more linkage assemblies pivotably mounted to the tailgate which permit the liftgate/tailgate platform to be translated both vertically and horizontally relative to the cargo area of the vehicle;

(c) rear impact protection mounted on the vehicle or on one or more of the liftgate/tailgate linkage assemblies, such that the rear impact protection is directly adjacent to the tailgate when the tailgate is in a closed position wherein the rear impact protection is attached directly to one or more of the linkage assemblies, and to no other portion of the vehicle.

2. The liftgate/tailgate assembly of claim 1 Wherein the rear impact protection is attached to one or more crosslink(s) of the linkage assemblies.

3. The liftgate/tailgate assembly of claim 1 or 2 wherein a portion of the rear impact protection abuts structural members connected to the vehicle chassis only when the liftgate/tailgate assembly is in a closed position.

4. A method for lifting a load into the cargo area of a vehicle while maintaining at least some rear impact protection, such vehicle having a chassis, a rear bumper beam, and a cargo area comprising a bed mounted to the vehicle chassis and one or more vertical sidewalls, such method comprising (a) pivotably mounting a tailgate to a movable vertical link, and translating the vertical link, and the associated tailgate, from a lowered position, both vertically and horizontally, with one or more cross-links, to align the tailgate with the bed of the cargo area of the vehicle;

(b) mounting the rear bumper beam to one or more of the linkage assemblies, but not to any other part of the vehicle;

(c) positioning structural members that are connected to the vehicle chassis so that they abut a portion of the rear bumper beam when the tailgate is in a closed position and form part of the rear impact protection of the vehicle.

* * * * *